No. 644,519. Patented Feb. 27, 1900.
C. JOHNSON.
CREAM SEPARATOR.
(Application filed July 15, 1899.)
(No Model.)
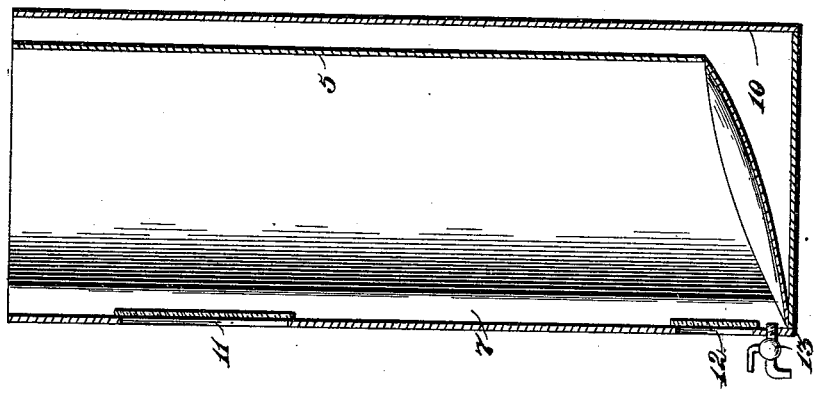
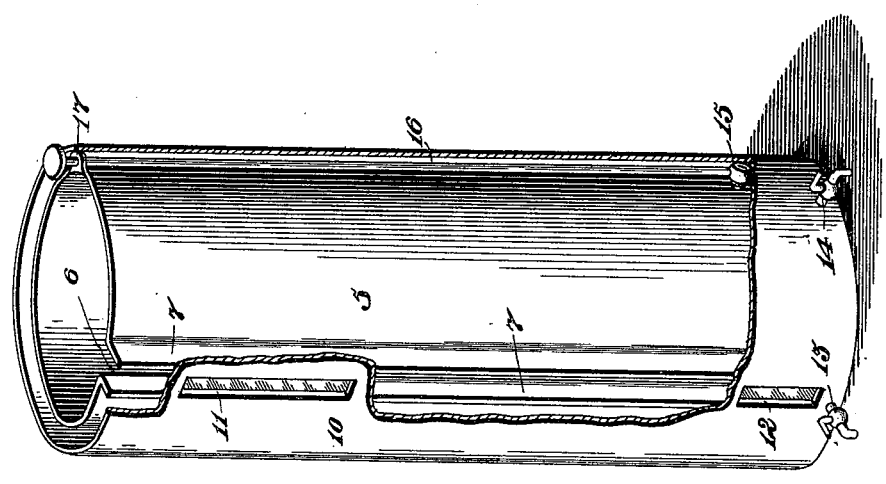
Witnesses
John Maupin
Geo. H. Chandler
Corwin Johnson, Inventor
By his Attorneys,
C. A. Snow & Co.

UNITED STATES PATENT OFFICE.

CORWIN JOHNSON, OF WATERTOWN, SOUTH DAKOTA.

CREAM-SEPARATOR.

SPECIFICATION forming part of Letters Patent No. 644,519, dated February 27, 1900.

Application filed July 15, 1899. Serial No. 723,976. (No model.)

*To all whom it may concern:*

Be it known that I, CORWIN JOHNSON, a citizen of the United States, residing at Watertown, in the county of Codington and State of South Dakota, have invented a new and useful Cream-Separator, of which the following is a specification.

This invention relates to cream-separators in general, and is particularly adapted for the utilization of that process which involves the mixture of a percentage of water with the milk to facilitate the separation of the cream therefrom.

The object of the invention is to provide a device of this nature in which a separation of the cream may be effected with or without the addition of water and that when no water is added the milk may be cooled and its temperature maintained at the desired degree.

In the drawings forming a portion of this specification, and in which similar numerals of reference designate corresponding parts in both views, Figure 1 is a perspective view of the device with a portion of the outer casing broken away to show the form and construction of the parts more clearly. Fig. 2 is a vertical section taken diametrically of the separator and between the flanges of the inner vessel.

Referring now to the drawings, the separator consists, essentially, of an inner vessel 5, which is substantially cylindrical in outline and has a vertical slot 6 continuously at one side thereof, radial outwardly-extending flanges 7 being formed at the sides of said slot, preferably by bending the material of the wall of the vessel outwardly. The bottom of the vessel 5 is sloped downwardly in the direction of the slot 6, so that said slot affords access to the lowermost portion of the vessel.

The vessel 5 is disposed within and concentric with an outer vessel 10, larger than the vessel 5 and having a radius equal to the radius of the inner vessel plus the extension of a flange 7. Thus the vessels may lie concentric and with the outer edges of the flanges 7 in intimate contact with the adjacent portion of the inner surface of the outer vessel.

In order that the interior of the vessel 5 may be inspected through the wall of the vessel 10, slots 11 and 12 are formed vertically of the outer vessel and registering with the slot 6. The slot 11 is adjacent the upper end of the vessel and is of sufficient length to extend below the possible cream-line after separation from a quantity of milk placed in the inner receptacle. Thus may the quantity of cream separated be determined by inspection at any time.

The slot 12 is adjacent the lower end of the slot 6 and permits a view of the bottom of the inner receptacle in order that an inspection of the bottom may be had when desired. It is of course understood that both slots 11 and 12 are provided with transparent coverings, as shown.

In order that the contents of the inner vessel may be withdrawn when desired, a spigot 13 has connection with the inner vessel through the outer vessel and opens into the slot 6. A second spigot 14 opens into the interspace between the vessels through the outer vessel 10.

In practice the milk from which the cream is to be separated is placed in an inner vessel 5, while a quantity of water is placed in the interspace between the vessels, and thus will absorb heat from the milk in the usual manner. By opening the spigot 14 a circulation of water through the interspace may be secured to effect a more rapid cooling.

In order to admit water to the inner vessel to assist the separation, a valve 15, disposed within the interspace between the vessels, communicates with the vessel 5 and with the interspace. An operating-rod 16, forming a continuation of the stem of the valve, projects above the vessels and has a bearing in a radial lug 17, extending outwardly from the vessel 5. Thus by opening the valve 15 a quantity of water may be allowed to pass from the interspace into the vessel 5 for the purpose above described.

It will of course be understood that in practice the inspection-openings may be varied in length, that the proportions and material of the apparatus may be altered as desired, and that various other changes may be made without departing from the spirit of the invention.

Having thus described the invention, what is claimed is—

1. A cream-separator comprising an inner and an outer vessel, said inner vessel having a longitudinal slot throughout its length, the material at the edges of the slot being bent outwardly to form flanges secured to the inner surface of the outer vessel in a water-tight manner, inspection-openings in the outer vessel communicating with the inner vessel through said slot and having transparent closures, and a bottom for the inner vessel extending beneath and connected with the lower ends of the flanges.

2. A cream-separator comprising an inner and an outer vessel separated by an interspace, a longitudinal slot in the inner vessel having flanges at its edges contacting with the inner surface of the outer vessel and secured thereto in a water-tight manner, inspection-openings in the outer vessel communicating with the inner vessel through said slot and having transparent closures, and a valved communication between the inner vessel and said interspace.

3. A cream-separator comprising an inner and an outer vessel separated by an interspace, a longitudinal slot in the inner vessel extending throughout the length thereof, flanges at the edges of the slot and contacting with the inner surface of the outer vessel and secured thereto in a water-tight manner, inspection-openings in the outer vessel communicating with said slot, and having transparent closures, a spigot communicating with said slot, a spigot communicating with the interspace through the outer vessel, and a valved communication between the inner vessel and the interspace.

In testimony that I claim the foregoing as my own I have hereto affixed my signature in the presence of two witnesses.

CORWIN JOHNSON.

Witnesses:
F. D. DROMESON,
G. C. FULLINWEIDER.